(12) United States Patent
Kim

(10) Patent No.: US 12,441,299 B2
(45) Date of Patent: Oct. 14, 2025

(54) DRIVING FORCE CONTROL APPARATUS, SYSTEM INCLUDING THE SAME, AND METHOD THEREOF

(71) Applicants: HYUNDAI MOTOR COMPANY, Seoul (KR); KIA CORPORATION, Seoul (KR)

(72) Inventor: Seung Ki Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 208 days.

(21) Appl. No.: 17/979,944

(22) Filed: Nov. 3, 2022

(65) Prior Publication Data

US 2023/0219562 A1  Jul. 13, 2023

(30) Foreign Application Priority Data

Jan. 7, 2022  (KR) .................. 10-2022-0002827

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/18* (2013.01);
(Continued)

(58) Field of Classification Search
CPC .......... B60W 10/04–08; B60W 10/18; B60W 10/184–192; B60W 30/045;
(Continued)

(56) References Cited

U.S. PATENT DOCUMENTS 6,064,161 A    5/2000  Takahara et al.
6,659,570 B2 * 12/2003 Nakamura ............. B60W 40/11
                                                 180/197

(Continued)

FOREIGN PATENT DOCUMENTS

CN    109878319 B  *  7/2021
JP    H0597023 A   *  4/1993
(Continued)

OTHER PUBLICATIONS

Zhang, CN 109878319, machine translation. (Year: 2021).*

*Primary Examiner* — Mark L. Greene
(74) *Attorney, Agent, or Firm* — Lempia Summerfield Katz LLC

(57) ABSTRACT

A driving force control apparatus includes: a sensor that collects information associated with a state of a vehicle, a driving device that provides a driving force to a drive wheel of the vehicle, and a processor electrically connected with the sensor and the driving device. In particular, the processor calculates a required driving force of a driver and a limit driving force of the vehicle based on at least a portion of information collected by means of the sensor, in a situation where the vehicle is turning. The processor further controls the driving device such that the required driving force does not exceed the limit driving force.

16 Claims, 9 Drawing Sheets

(51) Int. Cl.
  *B60W 10/18* (2012.01)
  *B60W 30/18* (2012.01)
  *B60W 40/06* (2012.01)
  *B60W 40/13* (2012.01)
(52) U.S. Cl.
  CPC .............. *B60W 30/18145* (2013.01); *B60W 30/18172* (2013.01); *B60W 40/06* (2013.01); *B60W 2040/1307* (2013.01); *B60W 2520/06* (2013.01); *B60W 2520/20* (2013.01); *B60W 2520/26* (2013.01); *B60W 2552/40* (2020.02); *B60W 2710/18* (2013.01)
(58) Field of Classification Search
  CPC ..... B60W 30/18145; B60W 30/18172; B60W 40/06–068; B60W 2040/1307; B60W 2520/06; B60W 2520/20; B60W 2520/26; B60W 2552/40; B60W 2710/18; G05D 1/0061; G05D 1/0088; G05D 1/021; G05D 1/0214; G05D 1/0221; G05D 1/0223
  See application file for complete search history.

(56) References Cited

U.S. PATENT DOCUMENTS

| | | | | |
|---|---|---|---|---|
| 8,200,408 | B2 * | 6/2012 | Turski | B60W 30/18145 701/87 |
| 10,124,801 | B2 * | 11/2018 | Mita | B60W 30/18027 |
| 2007/0265758 | A1 | 11/2007 | Miura | |
| 2017/0174192 | A1 | 6/2017 | Ying | |
| 2020/0086877 | A1 | 3/2020 | Zhang et al. | |
| 2020/0324758 | A1 | 10/2020 | Woo et al. | |
| 2021/0179056 | A1 | 6/2021 | Park | |
| 2022/0097683 | A1 | 3/2022 | Kim et al. | |
| 2024/0140206 | A1 * | 5/2024 | Leibeling | B60L 15/20 |

FOREIGN PATENT DOCUMENTS

| | | | |
|---|---|---|---|
| JP | 2004316639 A | * | 11/2004 |
| JP | 2005329861 A | * | 12/2005 |
| JP | 2008273289 A | | 11/2008 |
| KR | 20190016643 A | | 2/2019 |
| KR | 20210077084 A | | 6/2021 |
| KR | 20220043983 A | | 4/2022 |

\* cited by examiner

—— CONTROL ON
------ CONTROL OFF

DRIVING FORCE CONTROL APPARATUS, SYSTEM INCLUDING THE SAME, AND METHOD THEREOF

CROSS-REFERENCE TO RELATED APPLICATION

This application claims the benefit of and priority to Korean Patent Application No. 10-2022-0002827, filed in the Korean Intellectual Property Office on Jan. 7, 2022, the entire contents of which are incorporated herein by reference.

TECHNICAL FIELD

The present disclosure relates to a driving force control apparatus, a system including the same, and a method thereof, and more particularly, relates to technologies for preventing wheel slip from occurring by controlling a driving force of a drive motor.

BACKGROUND

The statements in this section merely provide background information related to the present disclosure and may not constitute prior art.

In general, an electronic stability control system for stably maintaining a state where a vehicle is traveling is applied to the vehicle.

When it is determined that a behavior of the vehicle is unstable contrary to the intention of a driver, such an electronic stability control system may add and subtract a braking force of each drive wheel to be suitable for a driving environment, thus preventing oversteer and understeer by a lateral force and a yaw rate generated in the vehicle from occurring.

For example, the electronic stability control system may apply a braking force to an outer drive wheel of a turning direction of the vehicle to generate a compensation moment acting on the outside of the vehicle in an oversteer situation in which the turning direction of the vehicle leans to the inside and may apply a braking force to an inner drive wheel of the turning direction of the vehicle to generate a compensation moment acting on the inside of the vehicle in an understeer situation in which the turning direction of the vehicle deviates outward, thus ensuring driving stability of the vehicle.

However, the control of the braking force by the electronic stability control system may be performed after it is determined that the behavior of the vehicle is unstable. Due to this, the generation of the compensation moment may be delayed.

Furthermore, a load of the vehicle may move in the driving situation. Due to this, a vertical force acting on the drive wheel (or the tire) may be changed. For example, as the load of the vehicle in an acceleration driving situation moves to the rear of the vehicle, a ground surface may be lost in a part of a tire mounted on the front wheel. Similarly, in deceleration driving situation, the load of the vehicle moves to the front of the vehicle, and thus the ground surface may be lost in a part of a tire mounted on the rear wheel. Due to this, a vertical force acting on the front wheel (or the rear wheel) may be reduced. For another example, as the ground surface is lost in a part of the tire mounted on an inner drive wheel of the vehicle by a centrifugal force in a situation where the vehicle is turning, a vertical force acting on the inner drive wheel may be reduced.

However, it is difficult to prevent wheel slip from occurring due to the reduction of a vertical force for the drive wheel, which occurs when the vehicle makes an emergency turn, for example, in a situation where the vehicle makes an emergency turn in an acceleration driving situation or an uphill driving situation.

SUMMARY

The present disclosure has been made to solve the above-mentioned problems occurring in the prior art while advantages achieved by the prior art are maintained intact.

An aspect of the present disclosure provides a driving force control apparatus for calculating a required driving force by a driver and a limit driving force according to a road surface state, when a vehicle is turning, and controlling a driving force such that the required driving force does not exceed the limit driving force, a system including the same, and a method thereof.

Another aspect of the present disclosure provides a driving force control apparatus for generating a braking force based on wheel slip, while the driving force is controlled such that a required driving force does not exceed a limit driving force, a system including the same, and a method thereof.

The technical problems to be solved by the present disclosure are not limited to the aforementioned problems, and any other technical problems not mentioned herein will be clearly understood from the following description by those having ordinary skill in the art to which the present disclosure pertains.

According to an aspect of the present disclosure, a driving force control apparatus may include a sensor configured to collect information associated with a state of a vehicle, a driving device configured to provide a driving force to a drive wheel of the vehicle, and a processor electrically connected with the sensor and the driving device. The processor may be configured to calculate a required driving force of a driver and a limit driving force of the vehicle based on at least a portion of information collected by means of the sensor, in a situation where the vehicle is turning, and control the driving device such that the required driving force does not exceed the limit driving force.

In an embodiment, the processor may be configured to calculate the limit driving force based on a maximum driving force of a tire and an estimated lateral force for the tire.

In an embodiment, the processor may be configured to determine a road surface state in the situation where the vehicle is turning and calculate the limit driving force based on the road surface state.

In an embodiment, the processor may be configured to generate a braking force at a certain level, when the required driving force exceeds the limit driving force.

In an embodiment, the processor may be configured to generate a braking force corresponding to a difference between the limit driving force and the required driving force.

In an embodiment, the processor may be configured to obtain a slip ratio for the vehicle as feedback information, while controlling the driving device and generate an additional braking force based on the feedback information.

In an embodiment, the processor may be configured to obtain a slip ratio for the vehicle as feedback information, while controlling the driving device, recalculate the limit driving force based on the feedback information, and control the driving device such that the required driving force does not exceed the recalculated limit driving force.

In an embodiment, the processor may be configured to determine a road surface state again in the situation where the vehicle is turning and recalculate the limit driving force.

In an embodiment, the processor may be configured to prevent lateral slip for the vehicle using a differential braking force, when controlling the driving device such that the required driving force does not exceed the limit driving force.

According to another aspect of the present disclosure, a vehicle system may include a manipulation device including a steering input device, an acceleration input device, and a brake input device and a driving force control apparatus electrically connected with the manipulation device. The driving force control apparatus may be configured to collect information associated with a state of a vehicle in a situation where the vehicle is turning and calculate a required driving force of a driver and a limit driving force of the vehicle based on at least a portion of the collected information and generate a braking force of a certain level, when the required driving force exceeds the limit driving force.

In an embodiment, the driving force control apparatus may be configured to obtain a slip ratio for the vehicle as feedback information, while the braking force of the certain level is generated, and generate an additional braking force based on the feedback information.

According to an aspect of the present disclosure, an operation method of a driving force control apparatus may include: collecting information associated with a state of a vehicle, in a situation where the vehicle is turning; calculating a required driving force of a driver and a limit driving force of the vehicle based on at least a portion of the collected information; and controlling a driving force for a drive wheel such that the required driving force does not exceed the limit driving force.

In an embodiment, the operation method may further include calculating the limit driving force based on a maximum driving force of a tire and an estimated lateral force for the tire.

In an embodiment, the operation method may further include: determining a road surface state in the situation where the vehicle is turning; and calculating the limit driving force based on the road surface state.

In an embodiment, the operation method may further include generating a braking force of a certain level, when the required driving force exceeds the limit driving force.

In an embodiment, the operation method may further include generating a braking force corresponding to a difference between the limit driving force and the required driving force.

In an embodiment, the operation method may further include: obtaining a slip ratio for the vehicle as feedback information, while controlling the driving force; and generating an additional braking force based on the feedback information.

In an embodiment, the operation method may further include: obtaining a slip ratio for the vehicle as feedback information, while controlling the driving force; recalculating the limit driving force based on the feedback information; and controlling the driving force for the drive wheel such that the required driving force does not exceed the limit driving force.

In an embodiment, the operation method may further include: determining a road surface state again in the situation where the vehicle is turning; and recalculating the limit driving force.

In an embodiment, the operation method may further include preventing lateral slip for the vehicle using a differential braking force, when controlling the driving force for the drive wheel.

BRIEF DESCRIPTION OF THE DRAWINGS

The above and other objects, features and advantages of the present disclosure should be more apparent from the following detailed description taken in conjunction with the accompanying drawings.

Figure 1:
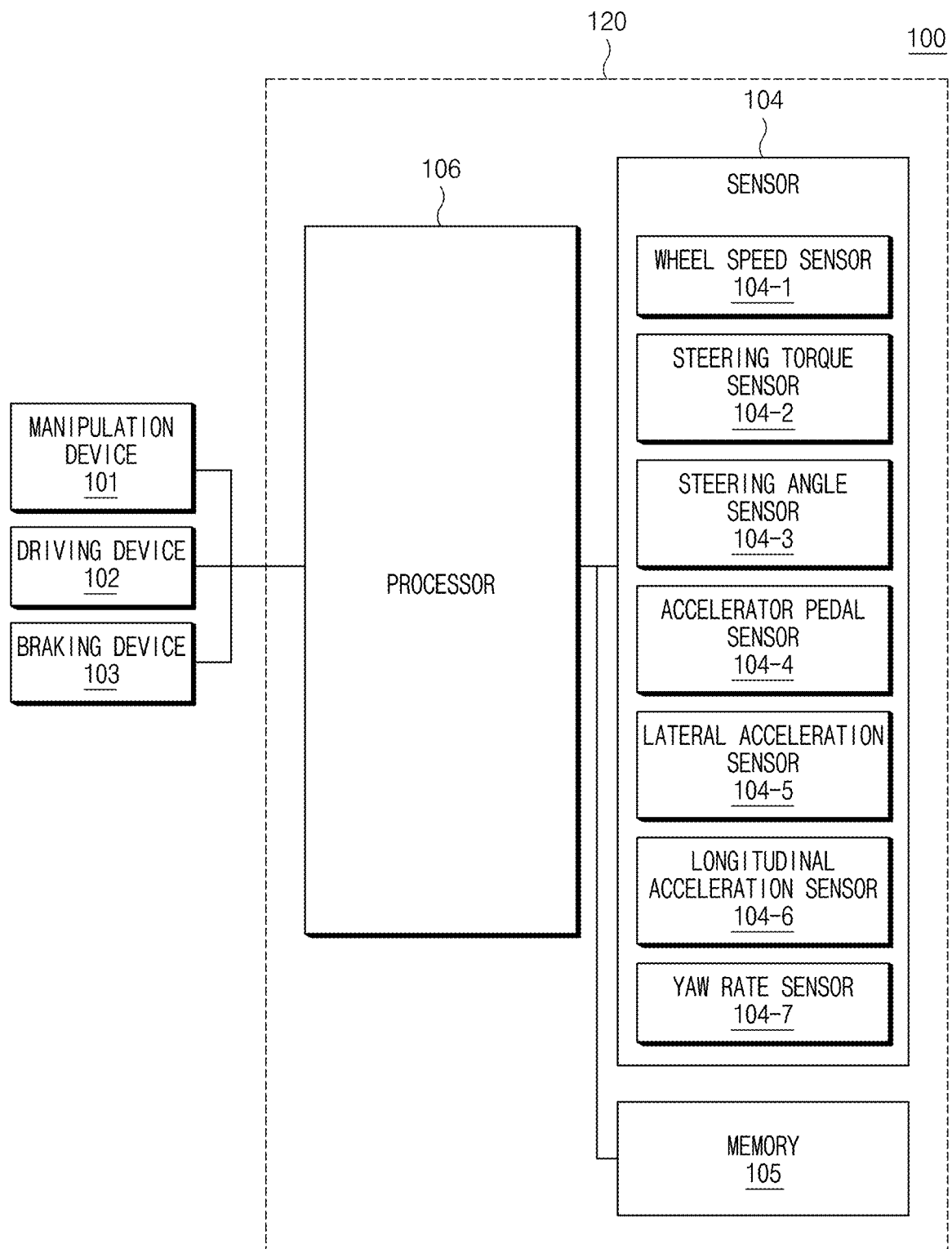
FIG. 1 is a block diagram illustrating a configuration of a vehicle system including a driving force control apparatus according to various embodiments of the present disclosure.

With regard to description of drawings, the same or similar denotations may be used for the same or similar components.

DETAILED DESCRIPTION

Hereinafter, some embodiments of the present disclosure are described in detail with reference to the exemplary drawings. In the drawings, the same reference numerals are used throughout to designate the same or equivalent elements. In addition, a detailed description of well-known features or functions have been ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

A vehicle described below may refer to a vehicle driven by the riding and manipulation of a driver and an autonomous vehicle having a function capable of allowing the vehicle to drive on its own without the intervention of the driver. Furthermore, a car is described as one example of a vehicle in the description below, and the present disclosure is not limited thereto. For example, various embodiments below are applicable to various means of transportation such as a ship, an airplane, a train, a motorcycle, or a bicycle.

Hereinafter, embodiments of the present disclosure will be described in detail with reference to FIGS. 1 to 7.

FIG. 1 is a block diagram illustrating a configuration of a vehicle system including a driving force control apparatus according to various embodiments of the present disclosure.

Referring to FIG. 1, a vehicle system 100 according to various embodiments may include a manipulation device 101, a driving device 102, a braking device 103, a sensor 104, a memory 105, and a processor 106.

However, this is merely illustrative, and the present disclosure is not limited thereto. For example, at least one of the components of the vehicle system 100 described above may be omitted or one or more other components may be added to the configuration of the vehicle system 100. Furthermore, at least one of the components of the vehicle system 100, which are described above, may be integrated with another component.

According to an embodiment, the manipulation device 101 may receive a user input for driving. According to an embodiment, the manipulation device 101 may include a steering input device (e.g., a steering wheel), an acceleration input device (e.g., an accelerator pedal), and a brake input device (e.g., a brake pedal).

However, this is merely illustrative, and various embodiments are not limited thereto. For example, devices for manipulating a seat heating wire, an interior light, a radio, a navigation system, a turn signal, a tail lamp, a headlamp, a wiper, an air conditioner and furnace, and the like loaded into the vehicle may be configured as at least a part of the manipulation device 101.

According to various embodiments, the driving device 102 may generate a power source associated with driving of the vehicle. According to an embodiment, the driving device 102 may include an engine and/or a motor. For example, power generated by the driving device 102 may be transferred to an axle through a transmission and a differential gear device. Thus, as a drive wheel rotates by the axle, the vehicle travels. The transmission, the differential gear device, the axle, and the drive wheel are well known in many documents, and a detailed description thereof has been omitted in the present disclosure.

According to various embodiments, the braking device 103 may perform electronic control of a brake apparatus in the vehicle. According to an embodiment, the braking device 103 may control an operation of brakes respectively arranged on a plurality of drive wheels to adjust a speed (e.g., deceleration) of the vehicle.

According to various embodiments, the sensor 104 may be composed of at least one sensor configured to collect (or detect) information associated with a state of the vehicle. The information associated with the state of the vehicle may include at least one of a wheel speed, a steering torque, a steering angle, an accelerator pedal operation, a lateral acceleration, a longitudinal acceleration, or a yaw rate. For example, the sensor 104 may be associated with at least one of a wheel speed sensor 104-1, a steering torque sensor 104-2, a steering angle sensor 104-3, an accelerator pedal sensor 104-4, a lateral acceleration sensor 104-5, a longitudinal acceleration sensor 104-6, or a yaw rate sensor 104-7.

However, this is merely illustrative, and various embodiments are not limited thereto. For example, the information associated with the state of the vehicle may be associated with a brake pedal operation. In this regard, a brake pedal sensor may be provided as a component of the sensor 104. Furthermore, the sensor 104 may include various types of sensors (e.g., a radar, a light detection and ranging (LiDAR), a camera, an ultrasonic sensor, a laser scanner, and the like) capable of detecting an obstacle located around the vehicle and obtaining information about a distance from the obstacle, a relative speed of the obstacle, and/or or a type of the obstacle (e.g., a vehicle, a pedestrian, a bicycle, a motorcycle, or the like).

The wheel speed sensor 104-1 may be mounted on the drive wheel and may be configured to measure revolutions per minute (RPM) of the drive wheel (or a wheel speed). The wheel speed sensor 104-1 is schematically shown as one in the drawing, but not limited thereto. The wheel speed sensor 104-1 may be mounted for each drive wheel to measure a rotational speed of each drive wheel.

The steering torque sensor 104-2 may be configured to sense a torque applied to a steering wheel by a driver.

The steering angle sensor 104-3 may be configured to measure a steering angle of the vehicle. The steering angle sensor 104-3 may be installed in a steering column switch cluster to measure a rotational angle of the steering wheel.

The accelerator pedal sensor 104-4 may be configured to measure a position of an accelerator pedal operated by the driver. For example, the accelerator pedal sensor 104-4 may output a quantitative measurement value corresponding to a displacement of the accelerator pedal.

The lateral acceleration sensor 104-5 may measure a lateral acceleration of the vehicle. The longitudinal acceleration sensor 104-6 may measure a longitudinal acceleration of the vehicle. For example, the lateral acceleration sensor 104-5 and the longitudinal acceleration sensor 104-6 may be implemented as a 3-axis accelerometer.

The yaw rate sensor 104-7 may be configured to measure an angular velocity, that is, a yaw rate, which rotates around a Z-axis. For example, a posture sensor, a gyro sensor, an inertial measurement unit (IMU), or the like may be used as the yaw rate sensor 104-7.

According to various embodiments, the memory 105 may include data related to at least one other component of the vehicle system 100 and a program, an algorithm, a routine, and/or an instruction associated with an operation (or control) of the vehicle system 100.

For example, the memory 105 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

According to various embodiments, the processor 106 may be electrically connected with the manipulation device 101, the driving device 102, the braking device 103, the sensor 104, and the memory 105 and may control the overall operation of the vehicle system 100. For example, the processor 106 may be an electronic control unit (ECU), a micro controller unit (MCU), or another sub-controller, which is loaded into the vehicle.

The vehicle system 100 according to various embodiments may include a driving force control apparatus 120 configured to control a driving force in a situation where the vehicle is turning to prevent wheel slip from occurring. Such a driving force control apparatus 120 may be implemented in the vehicle. In this case, the driving force control apparatus 120 may be integrally configured with control units in the vehicle or may be implemented as a separate device to be connected with the control units of the vehicle by a separate connection means. For example, the driving force control apparatus 120 may include the sensor 104, the memory 105, and the processor 106. However, this is merely illustrative, and another component of the vehicle system 100 may be added to the configuration of the driving force control apparatus 120.

The driving force control apparatus 120 according to various embodiments is described with reference to FIGS. 2A to 2C.

Figure 2A:
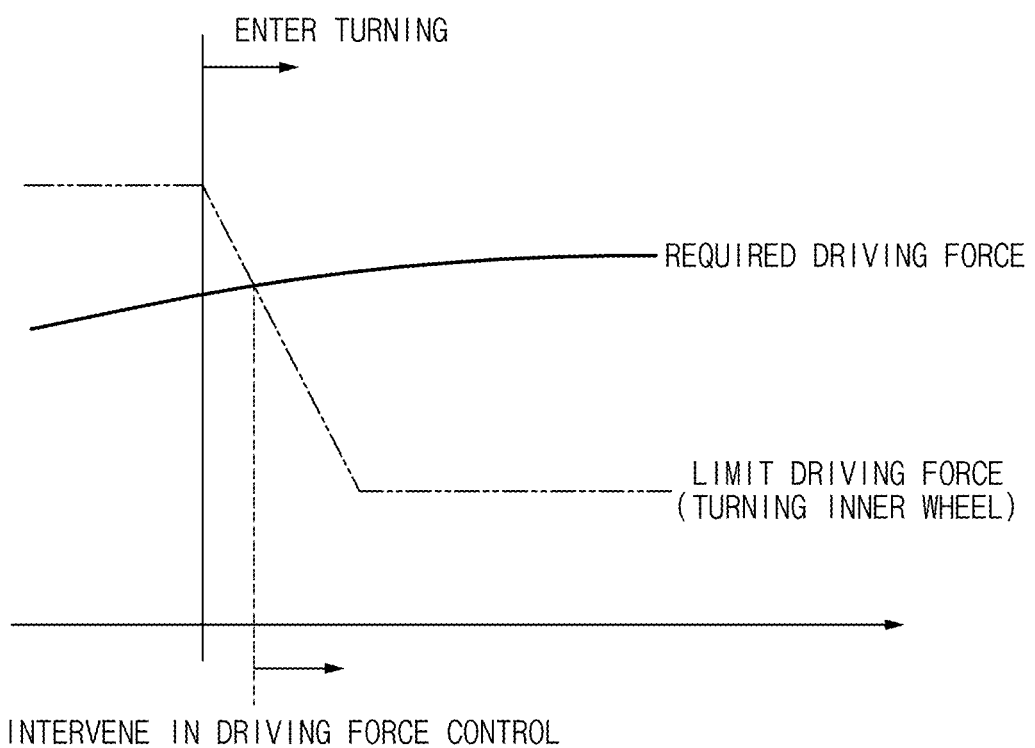
FIG. 2A is a drawing illustrating a time point when a driving force is adjusted by a driving force control apparatus according to various embodiments of the disclosure.

FIG. 2A is a drawing illustrating a time point when a driving force is adjusted by a driving force control apparatus 120. FIGS. 2B and 2C are drawings illustrating a control algorithm of a driving force control apparatus 120 according to various embodiments of the present disclosure.

Figure 2B:
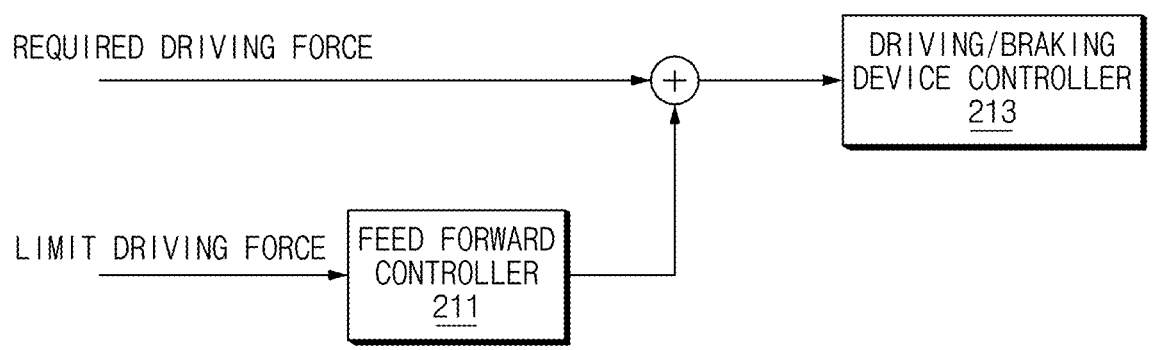
FIGS. 2B and 2C are drawings illustrating a control algorithm of a driving force control apparatus according to various embodiments of the present disclosure.
Figure 2C:
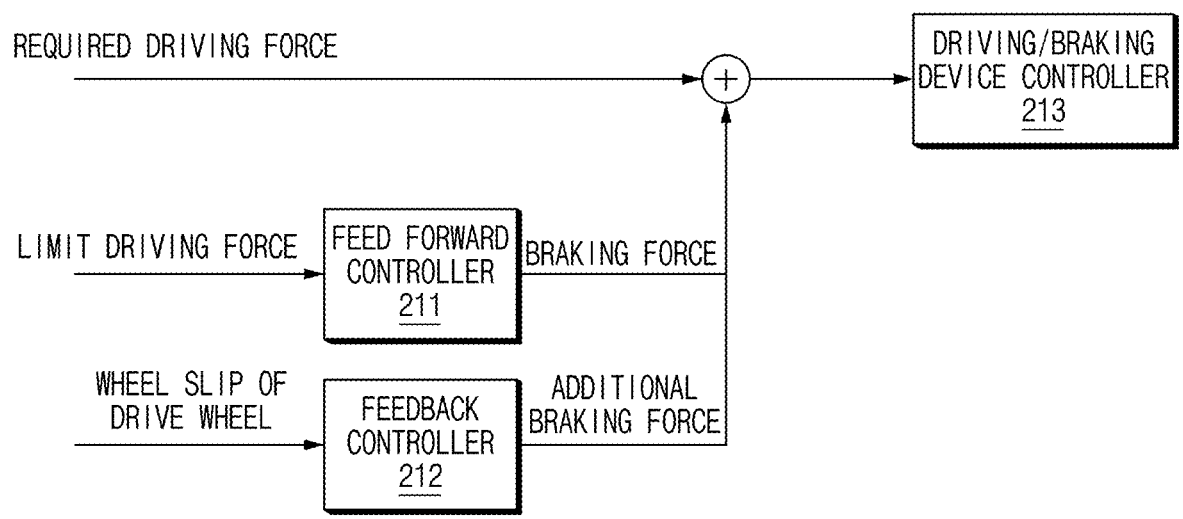

Referring to FIGS. 2A to 2C, as described above, the driving force control apparatus 120 according to an embodiment may prevent an excessive driving force exceeding a limit driving force from occurring in a situation where a vehicle is turning (or a situation where a steering intention of a driver to control the turning of the vehicle is detected) to reduce wheel slip and improve turning performance of the vehicle.

In this regard, the driving force control apparatus 120 (or a processor 106 of FIG. 1) may determine a time point when a driving force control operation for preventing wheel slip from occurring is performed, based on information collected by means of a sensor 104 of FIG. 1 while driving.

According to an embodiment, the driving force control apparatus 120 (or the processor 106) may calculate a required driving force in a situation where the vehicle is turning and a limit driving force of the vehicle and may determine a time point where a driving force control operation is performed based on the required driving force and the limit driving force. The required driving force may refer to a driving force required by the driver, and the limit driving force may refer to a maximum driving force where the vehicle is able to maintain and show a normal behavior. For example, as shown in FIG. 2A, the driving force control apparatus 120 (or the processor 106) may determine a time point where the required driving force exceeds the limit driving force in a state where the vehicle enters turning driving as a driving force control time point (e.g., a driving force control intervention time point).

In this regard, the driving force control apparatus 120 (or the processor 106) may determine a situation where the vehicle is turning (namely, turning situation), based on information collected by means of the sensor 104 while driving. The turning situation of the vehicle may be determined based on at least one of steering torque information, steering angle information, steering speed information, yaw rate information, or lateral acceleration information collected by means of the sensor 104. For example, a situation where an absolute value of a steering torque is greater than or equal to a reference torque and where signs of the steering angle, the steering speed, and the steering torque are the same as each other and a yaw rate and a lateral acceleration are less than or equal to a reference yaw rate and a reference lateral acceleration, respectively, may be determined as the situation where the vehicle is turning. However, this is illustrative, and the driving force control apparatus 120 (or the processor 106) may determine the situation where the vehicle is turning in various well-known methods.

According to various embodiments, when the situation where the vehicle is turning is determined, the driving force control apparatus 120 (or the processor 106) may calculate a required driving force and a limit driving force of the vehicle based on at least some of pieces of information collected by means of the sensor 104.

As described above, the required driving force may refer to a driving force required by a driver. For example, the driving force control apparatus 120 (or the processor 106) may apply at least one of a displacement of an accelerator pedal, a driving vehicle speed, a wheel speed, or RPM of an engine and/or motor to a predetermined driving force map to calculate the required driving force.

Furthermore, the limit driving force may refer to a maximum driving force where the vehicle is able to maintain and show a normal behavior. For example, the driving force control apparatus 120 (or the processor 106) may calculate a limit driving force based on a maximum driving force of a tire and a lateral force of the tire. For example, the limit driving force may be calculated by Equation 1 below.

$$\bar{F} = \sqrt{R_{min}^2 - \tilde{F}_y^2} \qquad \text{[Equation 1]}$$

where $R_{min}^2 = \min(R_{FL}^{kc}, R_{FR}^{kc})$

In Equation 1 above, $\bar{F}$ refers to the limit driving force, $\tilde{F}_y$ refers to the estimated lateral force for the drive wheel (or the tire), and $R_{FL}^{kc}$ and $R_{FR}^{kc}$ refer to the maximum driving force for the front left drive wheel and the maximum driving force for the front right drive wheel, respectively. Furthermore, $\tilde{F}_y$ may be calculated by Equation 2 below, and $R^{kc}$ may be calculated by Equation 3 below.

$$F_{y,F} + F_{y,R} = m_v a_y, \quad l_f F_{y,F} - l_r F_{y,R} = I_z \dot{\gamma} \qquad \text{[Equation 2]}$$

$$F_{y,F} = \frac{m_v a_y l_r + I_z \dot{\gamma}}{l_f + l_r}, \quad F_{y,R} = \frac{m_v a_y l_f - I_z \dot{\gamma}}{l_f + l_r}$$

$$\tilde{F}_{y,FL} = F_{y,F} \cdot \frac{\tilde{F}_{z,FL}}{\tilde{F}_{z,FL} + \tilde{F}_{z,FR}}$$

$$\tilde{F}_{y,FR} = F_{y,F} \cdot \frac{\tilde{F}_{z,FR}}{\tilde{F}_{z,FL} + \tilde{F}_{z,FR}}$$

$$\tilde{F}_{y,RL} = F_{y,R} \cdot \frac{\tilde{F}_{z,RL}}{\tilde{F}_{z,RL} + \tilde{F}_{z,RR}}$$

$$\tilde{F}_{y,RR} = F_{y,R} \cdot \frac{\tilde{F}_{z,RR}}{\tilde{F}_{z,RL} + \tilde{F}_{z,RFR}}$$

In Equation 2 above, $\tilde{F}_{y,FL}$ refers to the estimated lateral force for the front left drive wheel, $\tilde{F}_{y,FR}$ refers to the estimated lateral force for the front right drive wheel, $\tilde{F}_{y,RL}$ refers to the estimated lateral force for the rear left drive wheel, and $\tilde{F}_{y,RR}$ refers to the estimated lateral force for the rear right drive wheel. Furthermore, $F_{y,F}$ refers to the lateral force applied to the front of the vehicle, $F_{y,R}$ refers to the lateral force applied to the rear of the vehicle, $m_v$ refers to the mass of the vehicle, $l_f$ refers to the distance between the center of gravity of the vehicle and the front wheel axle, $l_r$ refers to the distance between the center of gravity of the vehicle and the rear wheel axle, $\dot{\gamma}$ refers to the value obtained by differentiating the yaw rate of the vehicle, $I_z$ refers to the moment of inertia of the vehicle, $a_x$ refers to the longitudinal acceleration of the vehicle, and $a_y$ refers to the lateral acceleration of the vehicle.

$$R^{kc} = \mu \cdot \tilde{F}_z \qquad \text{[Equation 3]}$$

In Equation 3 above, $R^{kc}$ refers to the magnitude of the maximum driving force for the drive wheel, $\mu$ refers to the friction coefficient, and $\tilde{F}_z$ refers to the estimated vertical force for the drive wheel. The driving force control apparatus 120 (or the processor 106) may determine a road surface state and may obtain a friction coefficient corresponding to the road surface state from a friction coefficient table to use the friction coefficient to calculate a maximum driving force. Furthermore, the estimated vertical force may be calculated by Equation 4 below.

[Equation 4]

$$\tilde{F}_{z,FL} = \frac{l_r m_v}{2(l_r + l_f)} g - \frac{h_{cg} m_v}{2(l_r + l_f)} a_x - \frac{h_{cg} l_r m_v}{t_f(l_r + l_f)} a_y + \frac{h_{cg}^2 m_v}{t_f g(l_r + l_f)} a_x a_y$$

$$\tilde{F}_{z,FR} = \frac{l_r m_v}{2(l_r + l_f)} g - \frac{h_{cg} m_v}{2(l_r + l_f)} a_x + \frac{h_{cg} l_r m_v}{t_f(l_r + l_f)} a_y - \frac{h_{cg}^2 m_v}{t_f g(l_r + l_f)} a_x a_y$$

$$\tilde{F}_{z,RL} = \frac{l_f m_v}{2(l_r + l_f)} g + \frac{h_{cg} m_v}{2(l_r + l_f)} a_x - \frac{h_{cg} l_f m_v}{t_f(l_r + l_f)} a_y - \frac{h_{cg}^2 m_v}{t_f g(l_r + l_f)} a_x a_y$$

$$\tilde{F}_{z,RR} = \frac{l_f m_v}{2(l_r + l_f)} g + \frac{h_{cg} m_v}{2(l_r + l_f)} a_x + \frac{h_{cg} l_f m_v}{t_f(l_r + l_f)} a_y + \frac{h_{cg}^2 m_v}{t_f g(l_r + l_f)} a_x a_y$$

In Equation 4 above, $\tilde{F}_{z,FL}$ refers to the estimated vertical force for the front left drive wheel, $\tilde{F}_{z,FR}$ refers to the estimated vertical force for the front right drive wheel, $\tilde{F}_{z,RL}$ refers to the estimated vertical force for the rear left drive wheel, and $\tilde{F}_{z,RR}$ refers to the estimated vertical force for the rear right drive wheel. Furthermore, $m_v$ refers to the mass of the vehicle, $l_f$ refers to the distance from the center of gravity of the vehicle and the front wheel axle, $l_r$ refers to the distance between the center of gravity of the vehicle and the rear wheel axle, $t_f$ refers to the front wheel distance indicating the distance between the central axis of the left front wheel and the central axis of the right front wheel, $t_r$ refers to the rear wheel distance indicating the distance between the central axis of the left rear wheel and the central axis of the right rear wheel, $h_{cg}$ refers to the height of the center of gravity of the vehicle, $g$ refers to the acceleration of gravity, $a_x$ refers to the longitudinal acceleration of the vehicle, and $a_y$ refers to the lateral acceleration of the vehicle.

As described above, the driving force control apparatus 120 (or the processor 106) may perform an operation of controlling a driving force at a time when the required driving force exceeds the limit driving force. In this regard, as shown in FIGS. 2B and 2C below, the driving force control apparatus 120 (or the processor 106) may control a driving force of the vehicle within a range which does not exceeds the limit driving force of the vehicle.

According to various embodiments, as shown in FIG. 2B, the driving force control apparatus 120 (or the processor 106) may control a driving force by means of a feed forward controller 211.

According to an embodiment, when the required driving force exceeds the limit driving force, the driving force control apparatus 120 (or the processor 106) may control the feed forward controller 211 to generate a braking force of a certain level.

For example, the braking force of the certain level, which is generated by the feed forward controller 211, may be added to the required driving force exceeding the limit driving force such that the required driving force is converted into the certain level or less, in other words, a level less than the limit driving force. The converted required driving force may be transferred to a driving device controller 213 (and/or a braking device controller). Due to this, the vehicle which is turning may provide a drive wheel grip force of the certain level or more to inhibit or prevent wheel slip of the vehicle from occurring. For example, the braking force of the certain level may have a value obtained by at least subtracting the required driving force from the limit driving force, like Equation 5 below.

$$F_{ff} = \bar{F} - F_{x,drv} \qquad \text{[Equation 5]}$$

In Equation 5 above, $F_{ff}$ refers to the braking force of the certain level provided by means of feed forward control, $\bar{F}$ refers to the estimated limit driving force, and $F_{x,drv}$ refers to the required driving force of the driver.

As described above, a state of a road surface may be considered in calculating the limit driving force. However, a situation where the driving force is not suitably controlled because the road surface state is changed or determination for the road surface state is inaccurate may not be excluded.

For example, a limit driving force having a relatively smaller value may be calculated in a situation where the vehicle travels on a wet road surface than a situation where the vehicle travels on a dry road surface. Due to this, a driving force having a relatively smaller value may be applied to the drive wheel. On the other hand, a limit driving force having a relatively larger value may be calculated in a situation where the vehicle travels on a dry road surface than a situation where the vehicle travels on a wet road surface. Due to this, a driving force having a relatively larger value may be applied to the drive wheel.

However, although the vehicle travels on a wet road surface, as a driving force having a relatively larger value is applied to the drive wheel due to an error in determining a road surface state, wheel slip may occur. On the other hand, although the vehicle travels on a dry road surface, as a driving force having a relatively smaller value is applied to the drive wheel due to an error in determination, acceleration performance a driver feels may be degraded.

In this regard, according to various embodiments, as shown in FIG. 2C, the driving force control apparatus 120 (or the processor 106) may generate an additional braking force by means of a feedback controller 212. For example, the additional braking force may be calculated by Equation 6 below.

$$F_{fb} = K \cdot \lambda_{max} \text{ where } \lambda = \frac{v_f - v_r}{v_f}, \lambda_{max} = \max(\lambda_L, \lambda_R) \qquad \text{[Equation 6]}$$

In Equation 6 above, $F_{fb}$ refers to the additional braking force of the certain level provided by means of feedback control, $v_f$ refers to the front wheel speed, $v_r$ refers to the rear wheel speed, and K refers to the slip ratio gain. For example, the driving force control apparatus 120 may determine a road surface state in calculating the additional braking force of the certain level provided by means of the feedback control and may obtain a gain corresponding to the road surface state from a slip ratio gain table.

According to an embodiment, the driving force control apparatus 120 (or the processor 106) may obtain a slip ratio of the drive wheel as feedback information, while controlling a driving force by means of the feed forward controller 211. The driving force control apparatus 120 (or the processor 106) may further generate an additional braking force based on the obtained slip ratio. For example, the slip ratio may be calculated by a difference between a wheel speed of a drive wheel provided in the front of the vehicle and a wheel speed of a drive wheel provided in the rear of the vehicle. According to an embodiment, when a slip ratio exceeding a predetermined reference value is calculated, the driving force control apparatus 120 (or the processor 106) may additionally generate a braking force of a certain level to inhibit or prevent slip of the drive wheel from occurring.

Additionally or alternatively, the driving force control apparatus 120 (or the processor 106) may obtain a slip ratio of the drive wheel as feedback information, while controlling a driving force by means of the feed forward controller 211. The driving force control apparatus 120 (or the processor 106) may further recalculate a limit driving force of the vehicle. For example, the recalculation of the limit driving force may be performed, when the number of times that the slip ratio exceeding the reference value is calculated is greater than a predetermined number that can be set as needed. A road surface state may be considered again in recalculating the limit driving force. Due to this, wheel slip may be prevented from occurring because an inaccurate driving force is applied due to an error in determining the road surface state or a change in road surface state.

Figure 3A:
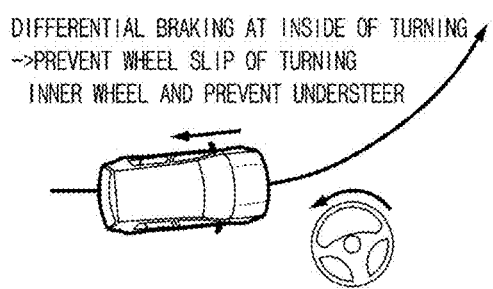
FIGS. 3A and 3B are drawings illustrating motion control of a vehicle system according to one embodiment of the present disclosure.
Figure 3B:
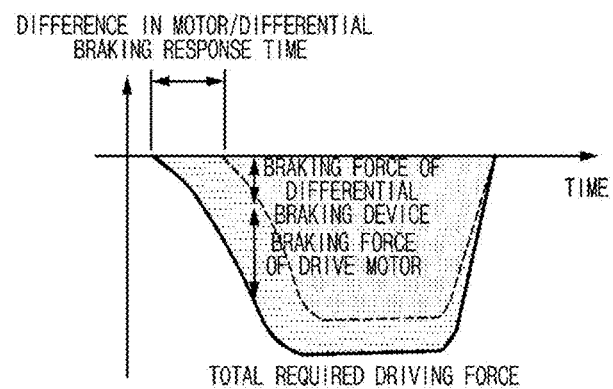

FIGS. 3A-3B are drawings illustrating motion control of a vehicle system according to the present disclosure. In the present embodiment, a description will be given of pitch motion control of a vehicle using a differential braking device.

As shown in FIG. 3A, when driving force control is required in a situation where a vehicle is turning, the vehicle system 100 of FIG. 1 may calculate a required driving force, which is a driving force required by a driver, and a limit driving force of the vehicle. As shown in FIG. 3B, the vehicle system 100 may control a differential braking device to adjust a braking force such that the required driving force does not exceed the limit driving force. At this time, the vehicle system 100 may first initiate braking control using a motor with a faster response speed than the differential braking device and may then control a braking force of the differential braking device.

FIGS. 4A-4D are graphs illustrating the result of comparing operation performance of a vehicle system according to the present disclosure with operation performance of a vehicle system according to a comparison embodiment.

FIGS. 4A-4D illustrate comparing the operation performance of the vehicle system (control ON) according to the present disclosure, in a vehicle which turns in a left direction while maintaining a speed of 80 kph on a road with a 12% climbing angle, with the operation performance of the vehicle system (control OFF) according to the comparison embodiment.

Figure 4A:
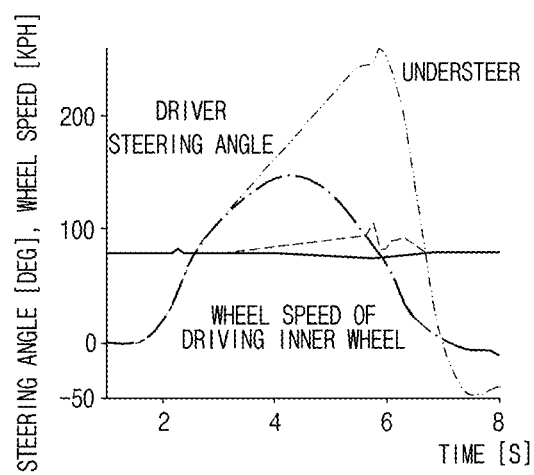
FIGS. 4A, 4B, 4C and 4D are drawings respectively illustrating the result of comparing operation performance of a vehicle system according to the present disclosure with operation performance of a vehicle system according to a comparison embodiment.

FIG. 4A illustrates a change in steering angle and wheel speed of the vehicle system according to the present disclosure and a change in steering angle and wheel speed of the vehicle system according to the comparison embodiment in a turning driving situation. Referring to FIG. 4A, it may be seen that, in the turning driving situation, wheel slip and an understeer phenomenon of a drive wheel (e.g., a left front drive wheel) occur in the vehicle system according to the comparison embodiment, whereas steering of the vehicle is stable and wheel slip of the drive wheel is prevented in the vehicle system according to the present disclosure. Thus, as the vehicle system controls a driving force not to exceed a limit driving force, turning performance of the vehicle is more improved than the vehicle system according to the comparison embodiment.

Figure 4B:
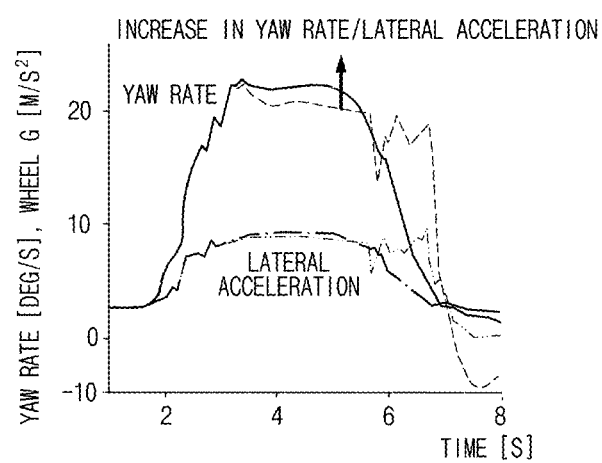

FIG. 4B illustrates a change in yaw rate and lateral acceleration of the vehicle system according to the present disclosure and a change in yaw rate and lateral acceleration of the vehicle system according to the comparison embodiment in a turning driving situation. Referring to FIG. 4B, it may be seen that, in the turning driving situation, a yaw rate of the vehicle system according to the present disclosure more increases than a yaw rate of the vehicle system according to the comparison embodiment. Thus, as an avoidance distance increases when the vehicle system according to the present disclosure makes an emergency turn, turning driving performance is more improved than the vehicle system according to the comparison embodiment.

Figure 4C:
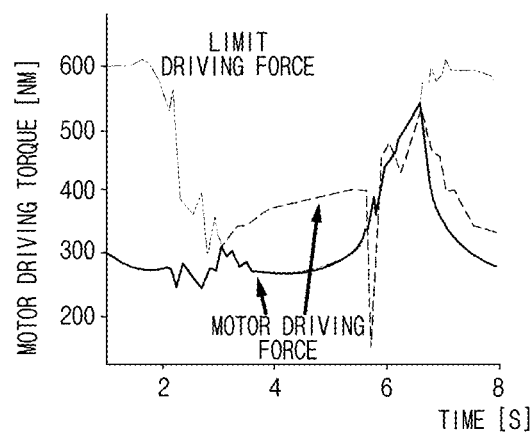

FIG. 4C illustrates a change in driving force of the vehicle system according to the present disclosure and a change in driving force of the vehicle system according to a comparison embodiment. Referring to FIG. 4C, it may be seen that, in a turning driving situation, a driving force of the vehicle system according to the comparison embodiment exceeds a limit driving force, whereas a driving force of the vehicle system according to the present disclosure does not exceed the limit driving force. Thus, the driving control of the vehicle system according to the present disclosure acts as a factor for improving turning performance.

Figure 4D:
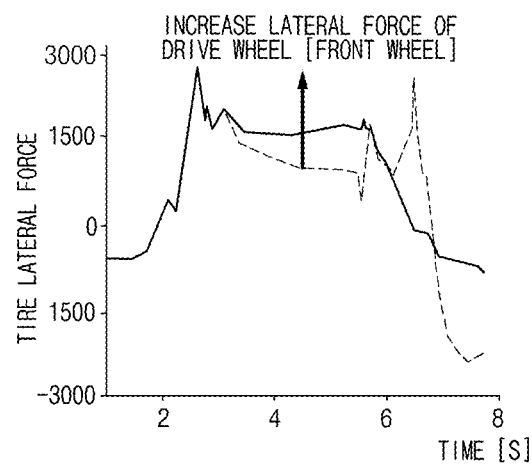

FIG. 4D illustrates a change in lateral force of the vehicle system according to the present disclosure and a change in lateral force of the vehicle system according to a comparison embodiment in a turning driving situation. Referring to FIG. 4D, it may be seen that, in the turning driving situation, a lateral force of the vehicle system according to the present disclosure more increases than a lateral force of the vehicle system according to the comparison embodiment. Thus, the vehicle system according to the present disclosure more effectively prevents understeer from occurring than the vehicle system according to the comparison embodiment.

Hereinafter, a description will be given of an operation method of a driving force control apparatus according to the present disclosure with reference to FIGS. 5 and 6.

Figure 5:
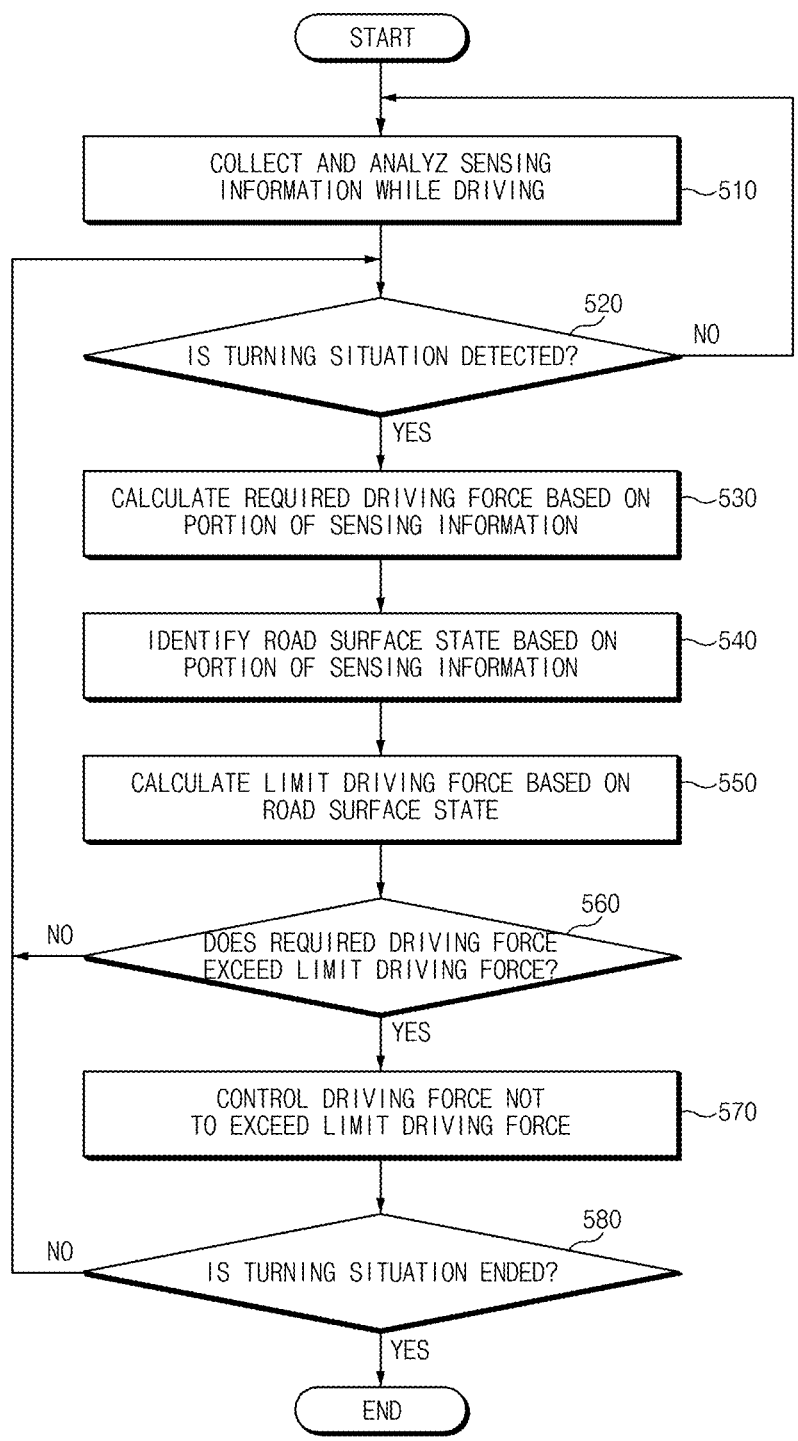
FIG. 5 is a flowchart illustrating an operation of a driving force control apparatus according to the present disclosure.

FIG. 5 is a flowchart illustrating an operation of a driving force control apparatus according to the present disclosure. Respective operations in an embodiment below may be sequentially performed, but are not necessarily sequentially performed. For example, an order of the respective operations may be changed, and at least two operations may be performed in parallel. Furthermore, at least one of operations below may be omitted according to an embodiment.

Referring to FIG. 5, in operation 510, a driving force control apparatus 120 (or a processor 106) of FIG. 1 may collect and analyze sensing information while driving. The sensing information may be used to determine a driving state (e.g., a turning situation) of a vehicle. According to an embodiment, the driving force control apparatus 120 may collect at least one of steering torque information, steering angle information, steering speed information, yaw rate information, or lateral acceleration information by means of a sensor 104 of FIG. 1.

According to various embodiments, in operation 520, the driving force control apparatus 120 (or the processor 106) may determine whether a turning situation is detected by analyzing the sensing information. According to an embodiment, in determining the turning situation, the driving force control apparatus 120 may use at least one of steering torque information, steering angle information, steering speed information, yaw rate information, or lateral acceleration information.

According to various embodiments, when the turning situation is detected, in operation 530, the driving force control apparatus 120 (or the processor 106) may calculate a required driving force based on at least a portion of the sensing information. The required driving force may refer to a driving force required by a driver. For example, the driving force control apparatus 120 may apply at least one of a displacement of an accelerator pedal, a driving vehicle speed, a wheel speed, or RPM of an engine and/or motor to a predetermined driving force map to calculate a required driving force.

According to various embodiments, in operation 540, the driving force control apparatus 120 (or the processor 106) may identify a road surface state based on at least a portion of the sensing information. According to an embodiment, the driving force control apparatus 120 may determine the road surface state as one of being dry, being wet, snowing, or icing using the slip ratio for the drive wheel. However, this is merely illustrative, and various embodiments are not limited thereto. For example, the driving force control apparatus 120 may radiate light to a road surface using an optical sensor to receive light reflected from the road surface and may determine a road surface state. In another embodiment, the driving force control apparatus 120 may determine a road surface state based on external information obtained from an external device.

According to various embodiments, in operation 550, the driving force control apparatus 120 (or the processor 106) may calculate a limit driving force based on the road surface state. According to an embodiment, the limit driving force refers to a maximum driving force where the vehicle is able to maintain and show a normal behavior. For example, the driving force control apparatus 120 may use Equations 1 to 4 above in calculating the limit driving force.

According to various embodiments, in operation 560, the driving force control apparatus 120 (or the processor 106) may compare the required driving force with the limit driving force. For example, the driving force control apparatus 120 may determine whether the required driving force exceeding the limit driving force is calculated.

According to various embodiments, when the required driving force exceeds the limit driving force, in operation 570, the driving force control apparatus 120 (or the processor 106) may control a driving force not to exceed the limit driving force. According to an embodiment, as described above with reference to FIG. 2B, the driving force control apparatus 120 (or the processor 106) may control a driving force by generating a braking force of a certain level by means of a feed forward controller 211.

According to various embodiments, in operation 580, the driving force control apparatus 120 (or the processor 106) may determine whether the turning situation of the vehicle is ended. According to an embodiment, the driving force control apparatus 120 control a driving force not to exceed the limit driving force until the turning situation is ended.

Figure 6:
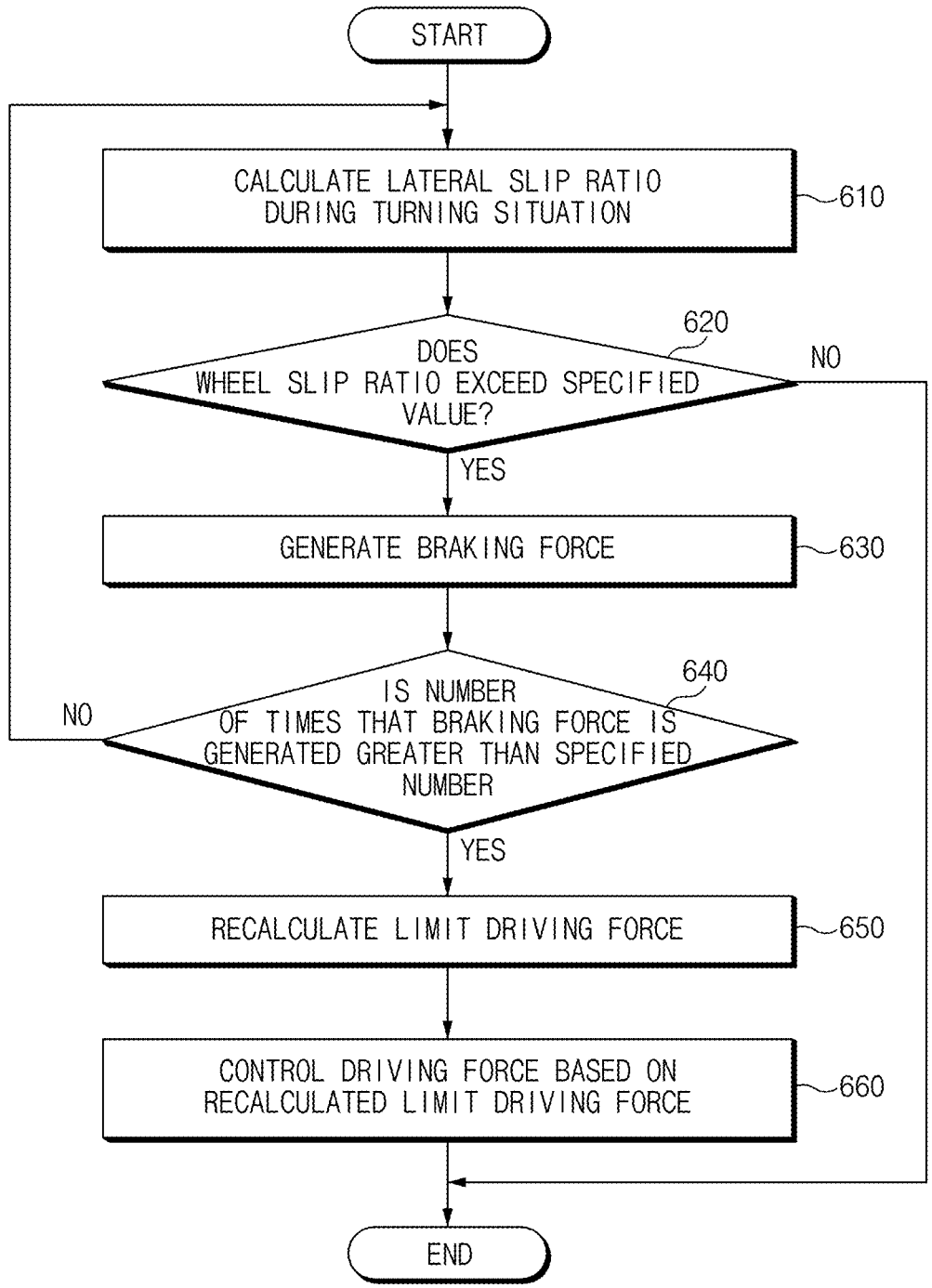
FIG. 6 is a flowchart illustrating a driving force control operation of a driving force control apparatus according to various embodiments of the present disclosure.

FIG. 6 is a flowchart illustrating a driving force control operation of a driving force control apparatus according to various embodiments of the present disclosure. Operations below may be various embodiments of operation 570 of FIG. 5.

Referring to FIG. 6, in operation 610, a driving force control apparatus 120 (or a processor 106) of FIG. 1 according to various embodiments may calculate a wheel slip ratio during a turning situation. The slip ratio may be calculated by a difference between a wheel speed of a drive wheel provided in the front of the vehicle and a wheel speed of a drive wheel provided in the rear of the vehicle.

According to various embodiments, in operation 620, the driving force control apparatus 120 (or the processor 106) may determine whether a slip ratio exceeding a predetermined reference value is calculated.

According to various embodiments, when the slip ratio exceeding the predetermined reference value is calculated, in operation 630, the driving force control apparatus 120 (or the processor 106) may generate a braking force of a certain level. For example, when the slip ratio exceeding the predetermined reference value is calculated, the driving force control apparatus 120 may determine that the road surface state is changed or that a situation where a driving force is not suitably controlled due to an error in determining the road surface state occurs. Thus, as described above with reference to FIG. 2C, the driving force control apparatus 120 may generate an additional braking force generated by means of a feedback controller 212 of FIG. 2C to prevent slip for a drive wheel from occurring.

According to various embodiments, in operation 640, the driving force control apparatus 120 (or the processor 106) may determine whether the number of times that the braking force is generated is greater than a predetermined number that can be set as needed. According to an embodiment, the driving force control apparatus 120 may increase the number of times that the braking force is generated whenever a braking force of a certain level is generated and may compare the increased number of times that the braking force is generated with the predetermined number.

According to various embodiments, when the number of times that the braking force is generated is greater than the predetermined number, in operation 650, the driving force control apparatus 120 (or the processor 106) may recalculate a limit driving force. According to an embodiment, the driving force control apparatus 120 may determine a road surface state again and may calculate a limit driving force based on the determined result.

According to various embodiments, in operation 660, the driving force control apparatus 120 (or the processor 106) may control a driving force based on the recalculated limit driving force. According to an embodiment, the driving force control apparatus 120 may control a driving force not to exceed the recalculated limit driving force.

Figure 7:
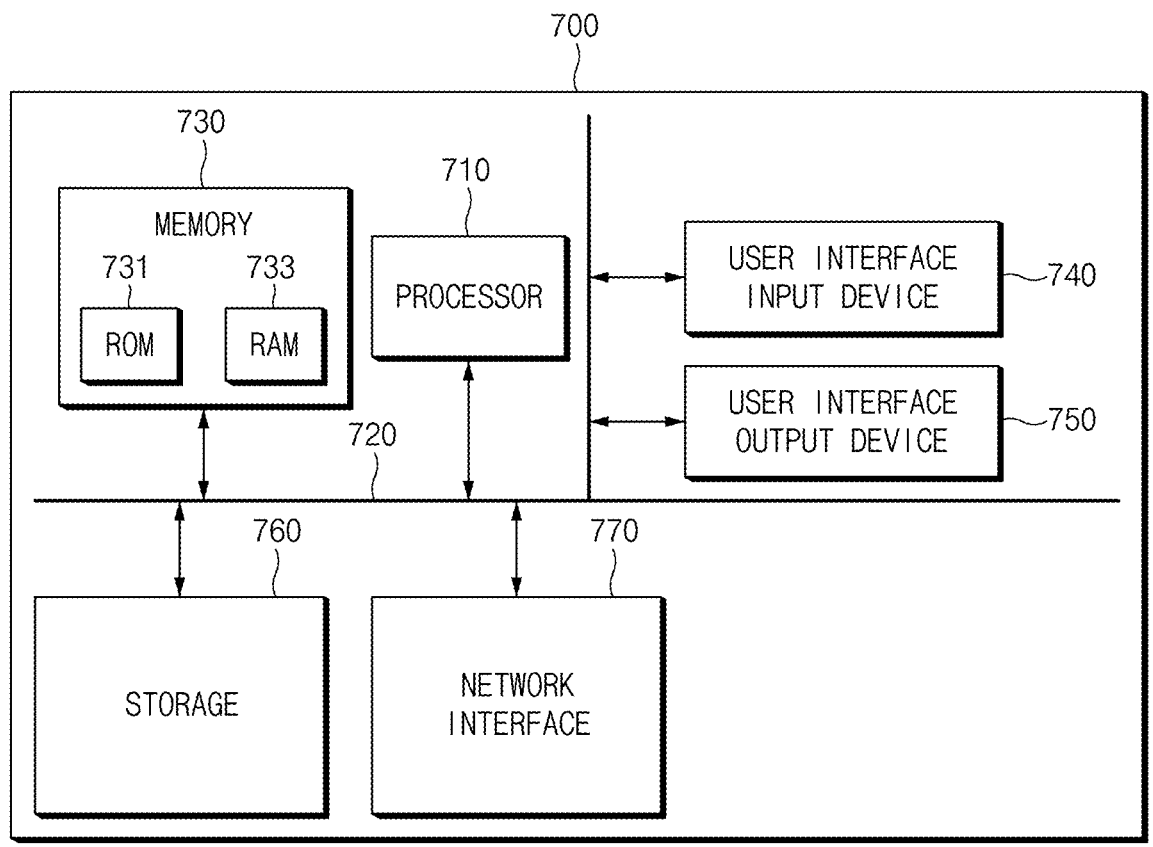
FIG. 7 is a block diagram illustrating a configuration of a computing system for executing the method according to an embodiment of the present disclosure.

FIG. 7 is a block diagram illustrating a configuration of a computing system for executing the method according to an embodiment of the present disclosure.

Referring to FIG. 7, a computing system 700 may include at least one processor 710, a memory 730, a user interface input device 740, a user interface output device 750, storage 760, and a network interface 770, which are connected with each other via a bus 720.

The processor 710 may be a central processing unit (CPU) or a semiconductor device that processes instructions stored in the memory 730 and/or the storage 760. The memory 730 and the storage 760 may include various types of volatile or non-volatile storage media. For example, the memory 730 may include a ROM (Read Only Memory) 731 and a RAM (Random Access Memory) 733.

Thus, the operations of the method or the algorithm described in connection with the embodiments disclosed herein may be embodied directly in hardware or a software module executed by the processor 710, or in a combination thereof. The software module may reside on a storage medium (that is, the memory 730 and/or the storage 760)

such as a RAM, a flash memory, a ROM, an EPROM, an EEPROM, a register, a hard disk, a removable disk, and a CD-ROM. The exemplary storage medium may be coupled to the processor 710. The processor 710 may read out information from the storage medium and may write information in the storage medium. Alternatively, the storage medium may be integrated with the processor 710. The processor 710 and the storage medium may reside in an application specific integrated circuit (ASIC). The ASIC may reside within a user terminal. In another case, the processor 710 and the storage medium may reside in the user terminal as separate components.

The present technology may prevent an excessive driving force exceeding a limit driving force from occurring when the vehicle is turning to reduce wheel slip, thus improving turning performance of the vehicle.

Furthermore, the present technology may additionally generate a braking force based on monitored wheel slip, while preventing an unnecessary driving force exceeding a limit driving force from occurring, thus preventing an excessive driving force from occurring.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A driving force control apparatus, comprising:
    a sensor configured to collect information associated with a state of a vehicle;
    a driving device including at least one of an engine or a motor and configured to provide a driving force to a drive wheel of the vehicle; and
    a processor electrically connected with the sensor and the driving device,
    wherein the processor is configured to:
        calculate a required driving force of a driver based on at least a portion of information collected by the sensor, in a situation where the vehicle is turning;
        calculate a limit driving force based on (i) a minimum value between a maximum driving force of a left drive wheel and a maximum driving force of a right drive wheel tire of the vehicle, and (ii) an estimated lateral force for a tire of the vehicle;
        compare the required driving force with the limit driving force;
        calculate a braking force when the required driving force exceeds the limit driving force; and
        provide the calculated braking force to a braking device,
    wherein the limit driving force corresponds to a maximum driving force at which the vehicle maintains lateral stability while the vehicle is turning.

2. The driving force control apparatus of claim 1, wherein the processor is configured to:
    determine a road surface state in the situation where the vehicle is turning and calculate the limit driving force based on the road surface state.

3. The driving force control apparatus of claim 1, wherein the processor is configured to:
    calculate the braking force corresponding to a difference between the limit driving force and the required driving force.

4. The driving force control apparatus of claim 1, wherein the processor is configured to:
    obtain a slip ratio for the vehicle as feedback information; and
    calculate an additional braking force based on the feedback information.

5. The driving force control apparatus of claim 1, wherein the processor is configured to:
    obtain a slip ratio for the vehicle as feedback information;
    recalculate the limit driving force based on the feedback information; and
    control the driving device such that the driving force does not exceed the recalculated limit driving force.

6. The driving force control apparatus of claim 5, wherein the processor is configured to:
    determine a road surface state again in the situation where the vehicle is turning and recalculate the limit driving force.

7. The driving force control apparatus of claim 1, wherein the processor is configured to:
    inhibit lateral slip for the vehicle using a differential braking force.

8. A vehicle system, comprising:
    a manipulation device including a steering input device, an acceleration input device, and a brake input device; and
    a driving force control apparatus electrically connected with the manipulation device,
    wherein the driving force control apparatus is configured to:
        collect information associated with a state of a vehicle in a situation where the vehicle is turning and calculate a required driving force of a driver based on at least a portion of the collected information;
        calculate a limit driving force based on (i) a minimum value between a maximum driving force of a left drive wheel and a maximum driving force of a right drive wheel tire-of the vehicle, and (ii) an estimated lateral force for a tire of the vehicle;
        compare the required driving force with the limit driving force;
        calculate a braking force when the required driving force exceeds the limit driving force; and
        provide the calculated braking force to a braking device,
    wherein the limit driving force corresponds to a maximum driving force at which the vehicle maintains lateral stability while the vehicle is turning.

9. The vehicle system of claim 8, wherein the driving force control apparatus is configured to:
    obtain a slip ratio for the vehicle as feedback information, while the braking force is calculated; and
    calculate an additional braking force based on the feedback information.

10. An operation method of a driving force control apparatus, the operation method comprising:
    collecting information associated with a state of a vehicle, in a situation where the vehicle is turning;

calculating a required driving force of a driver and a limit driving force of the vehicle based on at least a portion of the collected information;

calculating a limit driving force based on (i) a minimum value between a maximum driving force of a left drive wheel and a maximum driving force of a right drive wheel tire-of the vehicle, and (ii) an estimated lateral force for a tire of the vehicle;

comparing the required driving force with the limit driving force;

calculating a braking force when the required driving force exceeds the limit driving force; and controlling the driving force control apparatus to reduce a driving force of the vehicle based on the calculated braking force or providing the calculated braking force to a braking device, wherein the limit driving force corresponds to a maximum driving force at which the vehicle maintains lateral stability while the vehicle is turning.

11. The operation method of claim 10, further comprising:
determining a road surface state in the situation where the vehicle is turning and calculating the limit driving force based on the road surface state.

12. The operation method of claim 10, further comprising:
calculating the braking force corresponding to a difference between the limit driving force and the required driving force.

13. The operation method of claim 10, further comprising:
obtaining a slip ratio for the vehicle as feedback information, while controlling the driving force; and
calculating an additional braking force based on the feedback information.

14. The operation method of claim 10, further comprising:
obtaining a slip ratio for the vehicle as feedback information, while controlling the driving force;
recalculating the limit driving force based on the feedback information; and
controlling the driving force for the left drive wheel or the right drive wheel such that the driving force does not exceed the limit driving force.

15. The operation method of claim 14, further comprising:
determining a road surface state again in the situation where the vehicle is turning and recalculating the limit driving force.

16. The operation method of claim 10, further comprising:
inhibiting lateral slip for the vehicle using a differential braking force, when controlling the driving force control apparatus.

* * * * *

UNITED STATES PATENT AND TRADEMARK OFFICE
CERTIFICATE OF CORRECTION

PATENT NO. : 12,441,299 B2  
APPLICATION NO. : 17/979944  
DATED : October 14, 2025  
INVENTOR(S) : Seung Ki Kim Page 1 of 1

It is certified that error appears in the above-identified patent and that said Letters Patent is hereby corrected as shown below:

In the Claims

Column 15, Claim 1, Line 55 "tire" should be removed  
Column 16, Claim 8, Line 47 "tire" should be removed  
Column 17, Claim 10, Line 7 "tire" should be removed Signed and Sealed this  
Eighteenth Day of November, 2025

John A. Squires  
*Director of the United States Patent and Trademark Office*